(12) United States Patent
Pai

(10) Patent No.: US 7,793,874 B2
(45) Date of Patent: Sep. 14, 2010

(54) GRINDER AND AUTOMATIC OPEN/CLOSE CONTROL DEVICE THEREOF

(76) Inventor: Chung-Jen Pai, 1F, No. 83, Lane 26, Chung Hsiao St., Chung Ho, Taipei Hsien (TW)

( * ) Notice: Subject to any disclaimer, the term of this patent is extended or adjusted under 35 U.S.C. 154(b) by 352 days.

(21) Appl. No.: 12/081,109

(22) Filed: Apr. 10, 2008

(65) Prior Publication Data

US 2009/0166455 A1 Jul. 2, 2009

(30) Foreign Application Priority Data

Dec. 24, 2007 (TW) ............................... 96149644 A

(51) Int. Cl.
*A47J 43/00* (2006.01)

(52) U.S. Cl. ................. 241/168; 241/169.1; 241/261.1; 241/101.2

(58) Field of Classification Search ................. 241/168, 241/169.1, 261.1, 101.2
See application file for complete search history.

(56) References Cited

U.S. PATENT DOCUMENTS

| 4,771,955 | A | * | 9/1988 | Paulson | .................... | 241/169.1 |
|---|---|---|---|---|---|---|
| 5,865,384 | A | * | 2/1999 | Pai | ............................... | 241/93 |
| 7,377,458 | B1 | * | 5/2008 | Wu | .......................... | 241/169.1 |
| 7,604,190 | B2 | * | 10/2009 | Pai | .......................... | 241/169.1 |
| 2004/0016836 | A1 | * | 1/2004 | Pai | .......................... | 241/169.1 |
| 2004/0129812 | A1 | * | 7/2004 | Tang | ....................... | 241/169.1 |
| 2009/0095832 | A1 | * | 4/2009 | Wu | .......................... | 241/169.1 |

* cited by examiner

*Primary Examiner*—Bena Miller
(74) *Attorney, Agent, or Firm*—Guice Patents PLLC

(57) ABSTRACT

A grinder including a hollow base, a receptacle, an automatic open/close control device, a grinding unit, and a housing. The automatic open/close control device has a follower member, a bottom cover, a position-limitation structure, and a torsion spring connected between the follower member and the bottom cover. When a friction force produced during grinding of the grinder is greater than a torsional force of a torsion spring, the follower member is rotated relative to the bottom cover from a first position where radial blocks of the follower member block outlets of the bottom cover to a second position where the radial blocks of the follower member are moved away from the outlets of the bottom cover and guide slots of the follower member are moved into alignment with the outlets respectively for discharge of ground powder out of the grinder through the guide slots and the outlets.

15 Claims, 7 Drawing Sheets

GRINDER AND AUTOMATIC OPEN/CLOSE CONTROL DEVICE THEREOF

BACKGROUND OF THE INVENTION

1. Field of the Invention

The present invention relates to grinders and more particularly, to such a grinder, which automatically opens/closes the ground powder discharging outlets subject to the operation status.

2. Description of the Related Art

There are two different types of spice grinders available on the market, i.e., the manual type and the electric type. When grains or pieces of spice are put into a grinder, it is manually or electrically operated to grind the grains or pieces into powder for direct sprinkling onto food or soup. These grinders are quite popular among users for the advantage of instant grinding. Taiwan Patent No. 415215 (equivalent to U.S. Pat. No. 5,865,384), issued to the present inventor, discloses a similar design. According to this design, the grinder comprises a housing, a transmission shaft, a grinding unit, a particle size adjusting device, and a driving device. This design is functional, however it still has drawbacks. Before putting the material to be ground into the housing, the user must remove the driving device from the housing. This operation manner is inconvenient. Therefore, an improvement is necessary.

The aforesaid prior grinder can perform the basic functions of powder grinding job. However, the ground powder may stay at the clearance of the grinding unit, support frame of the adjustment device or the discharge outlet. When put the grinder on a table or sink at this time, residual ground powder may fall from the grinder to contaminate the surface of the table or sink upon accidental vibration of the grinder, and a further cleaning will be necessary. The present inventor invented an improved design entitled "Shut device for a discharge outlet in a grinder" under Taiwan Patent No. 592113 (equivalent to U.S. Pat. No. 6,880,773). The shut device comprises a stationary part disposed at the bottom of the grinder, and a rotary part. Once the rotary part is turned, hollow openings of the rotary part can align with the discharge outlet for ground powder falling down or stop plates of the rotary part close the discharge outlet for preventing the powder from falling down. Further, the stationary part and the rotary part are conveniently detachable for cleaning, eliminating the non-detachable drawback of the axial connection cap of the prior art design.

The aforesaid shut device is functional in closing/opening the discharge outlet of the grinder. However, the user may forget to adjust the shut device to the open position before using the grinder. In this case, ground powder may be accumulated in the gap between the discharge outlet and the shut device. Therefore, an improvement is still necessary.

SUMMARY OF THE INVENTION

The present invention has been accomplished under the circumstances in view. It is therefore the main object of the present invention to provide a grinder, which automatically opens the ground powder discharging outlets when the friction force produced during the grinding operation of the grinder surpasses the torsional force of a torsion spring thereof, and automatically closes the ground powder discharging outlets by means of energy releasing action of the torsion spring when the grinding operation is stopped.

To achieve this and other objects of the present invention, the grinder comprises a transmission shaft; a hollow base, the hollow base having a grinding chamber in which the transmission shaft suspends, and a plurality of open spaces in a bottom side thereof in communication with the grinding chamber; a grinding unit, the grinding unit comprising a grinding wheel and a grinding base, the grinding wheel being connected to the transmission shaft for rotation with the transmission shaft in the grinding chamber and kept spaced from the grinding base by a gap; a receptacle mounted on a top side of the hollow base, the receptacle comprising a bottom chamber, which holds the grinding base of the grinding unit in place; a housing, which houses the hollow base and a lower part of the receptacle; an automatic open/close control device for closing/opening the open spaces of the hollow base, the automatic open/close control device comprising a follower member connected to a bottom side of the hollow base opposite to the receptacle, the follower member comprising an axle holder fastened to one end of the transmission shaft and a plurality of radial blocks and guide slots radially and alternatively disposed at a bottom side thereof, a bottom cover, the bottom cover comprising a plurality of outlets cut through top and bottom sides thereof corresponding to the guide slots of the follower member, a position-limitation structure provided between the follower member and the bottom cover to secure the bottom cover to the follower member and to limit relative rotary motion between the follower member and the bottom cover within a predetermined angle, and a torsion spring connected between the follower member and the bottom cover; wherein when rotating the housing relative to the receptacle, the bottom cover, the follower member, the transmission shaft and the grinding wheel are rotated with the housing; when the friction force produced between the grinding wheel and the grinding base is greater than the torsional force of the torsion spring, the follower member is rotated relative to the bottom cover from a first position where the radial blocks of the follower member block the outlets of the bottom cover to a second position where the radial blocks of the follower member are moved away from the outlets of the bottom cover and the guide slots of the follower member are moved into alignment with the outlets respectively for discharge of ground powder out of the grinder through the guide slots and the outlets, and at the same time the torsion spring is twisted to preserve energy.

The invention also provides an automatic open/close control device for use in a grinder to automatically open/close the output side of the grinder. The automatic open/close control device comprises a follower member connected to a bottom side of a grinder, the follower member comprising an axle holder fastened to one end of a transmission shaft of the grinder, and a plurality of radial blocks and guide slots radially and alternatively disposed at a bottom side thereof; a bottom cover, the bottom cover comprising a plurality of outlets cut through top and bottom sides thereof corresponding to the guide slots of the follower member; a position-limitation structure provided between the follower member and the bottom cover to secure the bottom cover to the follower member and to limit rotary motion of the follower member relative to the bottom cover within a predetermined angle; and a torsion spring connected between the follower member and the bottom cover. When the friction force produced bin the grinding unit during operation of the grinder is greater than the torsional force of the torsion spring, the follower member is rotated relative to the bottom cover from a first position where the radial blocks of the follower member block the outlets of the bottom cover to a second position where the radial blocks of the follower member are moved away from the outlets of the bottom cover and the guide slots of the follower member are moved into alignment with the outlets respectively for discharge of ground powder out of the grinder through the guide slots and the outlets, and at the same time the torsion spring is twisted to preserve energy.

DETAILED DESCRIPTION OF THE PREFERRED EMBODIMENT

Figure 1:
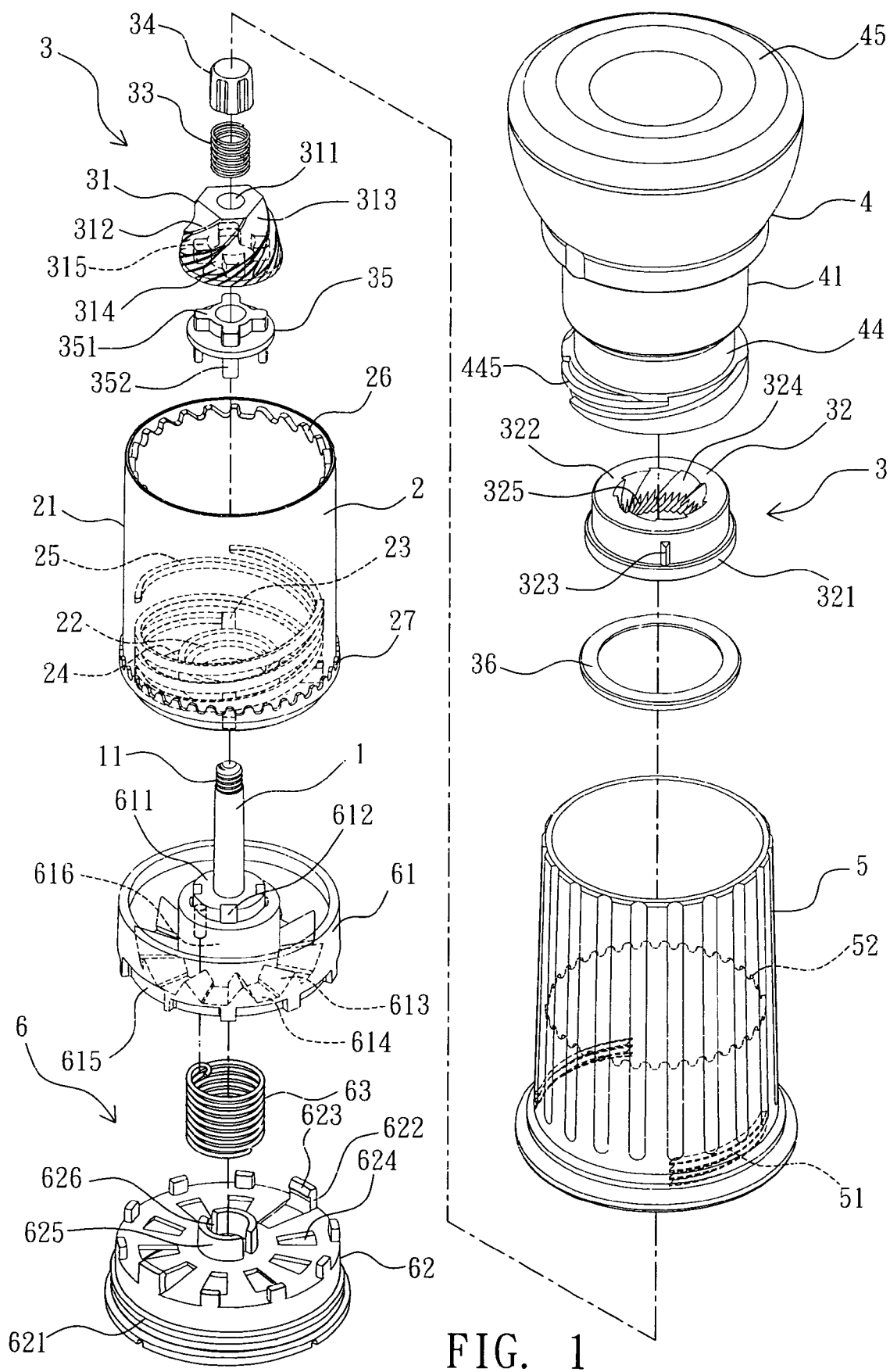
FIG. 1 is an exploded view of a grinder in accordance with the present invention.
Figure 2:
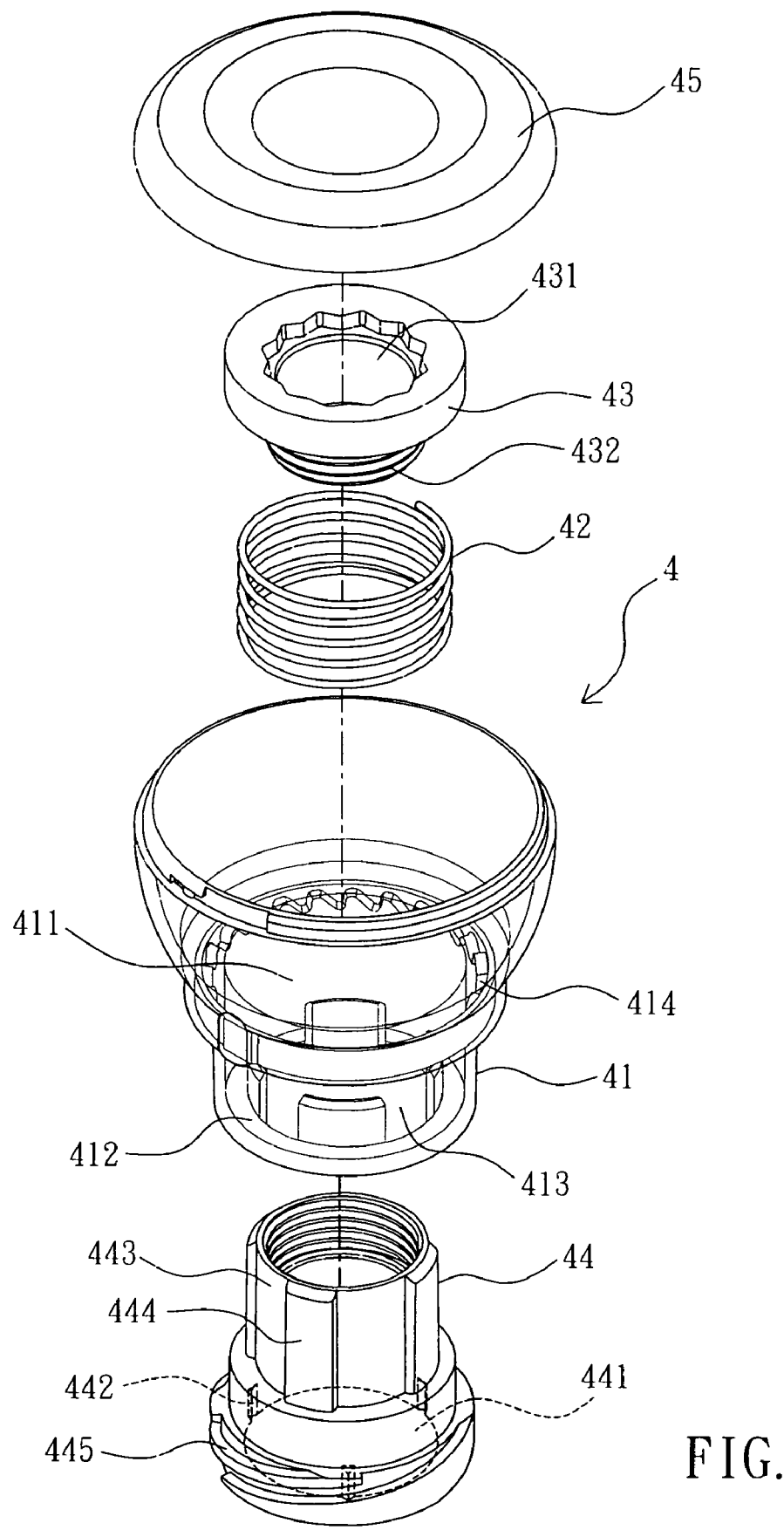
FIG. 2 is an exploded view of the receptacle for the grinder in accordance with the present invention.
Figure 3:
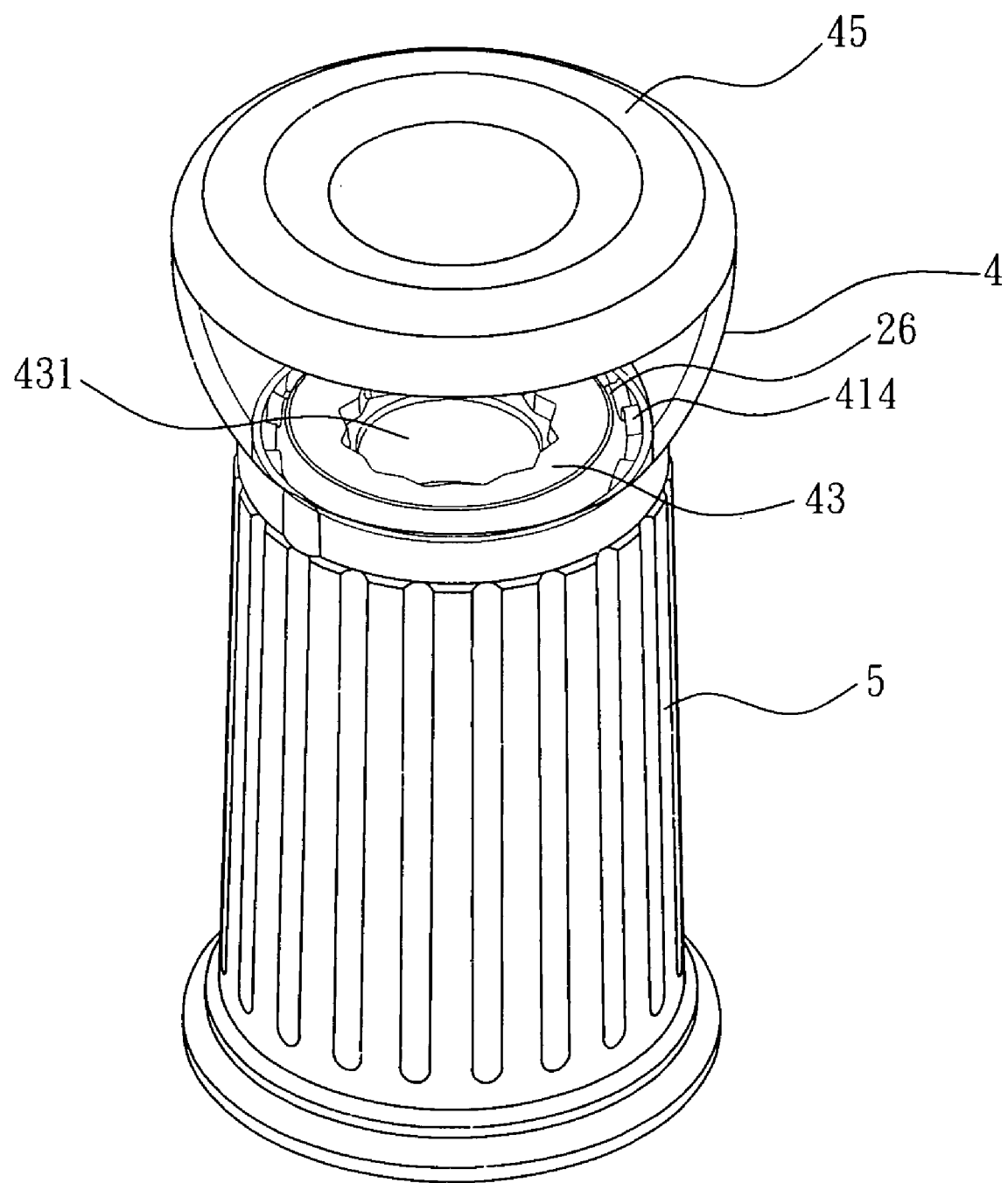
FIG. 3 is a perspective view of the grinder in accordance with the present invention.
Figure 4:
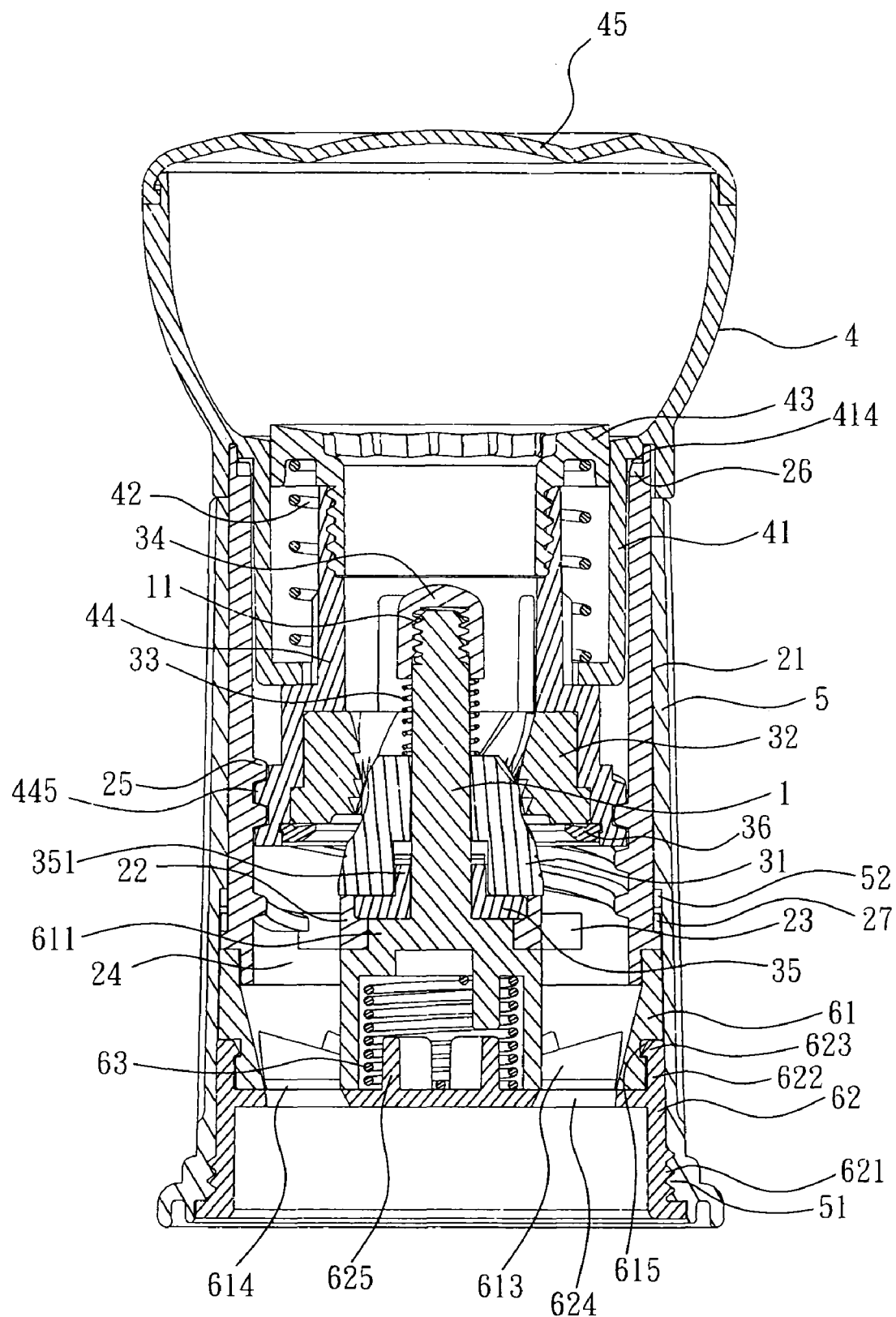
FIG. 4 is a sectional assembly view of the grinder in accordance with the present invention.

Referring to FIGS. 1~4, a grinder in accordance with the present invention is shown comprised of a transmission shaft 1, a base 2, a grinding unit 3, a receptacle 4, a housing 5, and an automatic open/close control device 6.

The transmission shaft 1 is a rod member coupled to a grinding wheel 31 of the grinding unit 3 for synchronous movement. According to the present preferred embodiment, as shown in FIG. 1, the grinder is a manual grinder, and the transmission shaft 1 is vertically fastened to an axle holder 611 of a follower member 61 of the automatic open/close control device 6. Alternatively, a power drive can be used for rotating the transmission shaft 1 and the grinding wheel 31.

The base 2 is a top-open barrel, having its bottom side fastened to the follower member 61 of the automatic open/close control device 6 and its top side connected with the receptacle 4. The base 2 has a grinding chamber 21 into which the transmission shaft 1 is inserted from the bottom side, an annular coupling flange 22 suspending in the bottom open side of the grinding chamber 21 at the center and coupled to the axle holder 611 of a follower member 61 of the automatic open/close control device 6, a plurality of radial ribs 23 radially connected between the annular coupling flange 22 and the peripheral wall of the grinding chamber 21, a plurality of bottom open spaces 24 disposed around the annular coupling flange 22 and separated from one another by the radial ribs 23 for guiding the ground powder out of the grinding chamber 21 into the automatic open/close control device 6, inner threads 25 extending around the inside wall of the grinding chamber 21, a retaining means, for example, ratchet 26 extending around the top open side of the grinding chamber 21, and an engagement means 27, for example, gear ring extending around the bottom side of the outer surface of the periphery wall of the grinding chamber 21 for engagement with a stopping means 52 on the middle of the inside wall of the housing 5 to prohibit rotation of the base 2 with the receptacle 4.

The grinding unit 3 is comprised of the aforesaid grinding wheel 31 and a grinding base 32. The grinding base 32 is provided at the top side of the grinding wheel 31. The grinding wheel 31 is a conical member having a center mounting hole 311 coupled to the transmission shaft 1. After insertion of the transmission shaft 1 through the center mounting hole 311 of the grinding wheel 31, a screw cap 34 is threaded onto the threaded top end 11 of the transmission shaft 1 to secure the grinding wheel 31 to the transmission shaft 1. Further, a compression spring 33 is sleeved onto the transmission shaft 1 and supported between the screw cap 34 and the top side of the grinding wheel 31. Further, the grinding wheel 31 has a plurality of spiral wings 312 equiangularly spaced around the center mounting hole 311, a plurality of spiral grooves 313 equiangularly spaced around the center mounting hole 311 and separated from one another by the spiral wings 312 for guiding the loaded material, for example, spice outwardly downwards, a plurality of sloping teeth 314 arranged around the periphery for moving the loaded material relative to the grinding base 32, and a bottom coupling portion 315, for example, crossed coupling hole disposed at the center of the bottom side thereof for the coupling of a top coupling portion (crossed coupling block) 351 of a link 35. The link 35 further has a plurality of bottom mounting rods 352 respectively fastened to respective vertical mounting grooves 612 on the axle holder 611 of the automatic open/close control device 6 for allowing synchronous rotation of the grinding wheel 31 with the follower member 61 and the transmission shaft 1.

The grinding base 32 is a circular, stepped, hollow member fixedly fastened to a bottom rotary cap 44 of the receptacle 4, having a bottom portion 321 of relatively greater outer diameter and a top body portion 322 of relatively smaller outer diameter. The top body portion 322 has a plurality of locating ribs 323 spaced around the periphery and fastened to the rotary cap 44 of the receptacle 4 for synchronous rotation with the rotary cap 44, a plurality of oblique guide ribs 324 spaced around the upper part of its inside wall, and a plurality of fine grinding teeth 325 spaced around the lower part of its inside wall. The inner diameter of the top body portion 322 of the grinding base 32 is slightly smaller than the outer diameter of the grinding wheel 31 so that the grinding wheel 31 is prohibited from entering the grinding base 32 and a gap is constantly kept between the grinding wheel 31 and the grinding base 32. When rotating the grinding wheel 31, the loaded grain or strip-like material falls to the spiral grooves 313 among the spiral wings 312 and is carried by the spiral wings 312 and the spiral grooves 313 toward gaps in between the sloping teeth 314 and the grinding teeth 325 for grinding into powder different particle sizes. Fine particle size powder immediately falls out of the grinding unit 3. Powder having a particle size greater than the gap between of the grinding wheel 31 and the grinding base 32 is continuously ground. According to the present preferred embodiment, the grinding wheel 31 and the grinding base 32 are respectively made of acid-proof, wearing proof, anti-oxidation precision ceramics, preventing deterioration of the grinding grain or strip-like material.

The receptacle 4 is hollow, inverted cone mounted on the base 2 at the top. Preferably, the receptacle 4 is transparent so that the user can visually check the amount of the loaded material to be ground. A tubular coupling flange 41 extending around the bottom side of the receptacle 4, and the tubular coupling flange 41 comprises a opening 411, and an annular step 412 protruded from the inside wall of the tubular coupling flange 41. An elastic member 42, for example, spring is supported on the annular step 412 inside the receptacle 4. A guide feeder 43 is supported on the elastic member 42 inside the receptacle 4. The guide feeder 43 has a center guide hole 431 for guiding the loaded material into the aforesaid rotary cap 44 and then the grinding unit 3 for grinding, and a bottom neck 432 for the fastening of the rotary cap 44. The rotary cap 44 has a bottom chamber 441, which receives the grinding base 32, and a plurality of locating grooves 442 respectively forced into engagement with the locating ribs 323 of the grinding base 32, and a stopping ring 36 mounted on a bottom side of the bottom chamber 441 to secure the grinding base 32 to the bottom side of the rotary cap 44.

The rotary cap 44 further has a tubular top coupling flange 443 inserted into the tubular coupling flange 41 extending around the bottom side of the receptacle 4, a plurality of longitudinal rails 444 spaced around the outside wall of the tubular top coupling flange 443 and respectively coupled to respective longitudinal grooves 413 on the inside wall of the tubular coupling flange 41 to guide axial movement of the receptacle 4 relative to the rotary cap 44 and to prohibit rotation of the receptacle 4 relative to the rotary cap 44.

The bottom neck 432 of the guide feeder 43 is a threaded neck threaded into the internally threaded tubular top coupling flange 443 of the rotary cap 44. Therefore, the guide feeder 43 and the rotary cap 44 are fastened together, and the elastic member 42 is stopped between the guide feeder 43 and the annular step 412 of the receptacle 4. The rotary cap 44 further has outer threads 445 engaged with the inner threads 25 of the base 2. The engagement status between the outer threads 445 of the rotary cap 44 and the inner threads 25 of the base 2 defines the gap between the grinding wheel 31 and the grinding base 32.

The tubular coupling flange 41 of the receptacle 4 has a retaining means 414, for example, toothed ring for engagement with the ratchet 26 of the base 2 to prohibit rotation of the receptacle 4 relative to the base 2 and adjustment of the gap between the grinding base 32 and the grinding wheel 31. Further, a top cover 45 is covered on the top side of the receptacle 4.

The housing 5 houses the base 2 and the lower part of the receptacle 4. During the use of the grinder, hold the receptacle 4 with one hand and rotate the housing 5 relative to the receptacle 4 with the other hand. When rotating the housing 5 relative to the receptacle 4, the transmission shaft 1 and the grinding wheel 31 are rotated with the housing 5. The housing 5 has a connection means 51, for example, inner threads extending around the inside wall thereof near the bottom for connection to a bottom cover 62 of the aforesaid automatic open/close control device 6, the aforesaid stopping means 52 for engagement with the engagement means 27 of the base 2 to prohibit rotation of the base 2 with the receptacle 4.

The automatic open/close control device 6 is comprised of the aforesaid follower member 61, the bottom cover 62, and a torsion spring 63. The follower member 61 has the aforesaid axle holder 611 disposed at the center, which receives the bottom end of the transmission shaft 1, the aforesaid vertical mounting grooves 612 formed on the axle holder 611 and respectively engagement with the bottom mounting rods 352 of the link 35, a plurality of radial blocks 613 radially extended from and equiangularly spaced around the periphery of the axle holder 611 near the bottom, a plurality of sector-like guide slots 614 respectively defined between each two adjacent radial blocks 613, limit grooves 615 extending along the bottom side of the periphery thereof, and a bottom spring hole 616 at the center of the bottom wall for accommodating one end of the torsion spring 63.

The bottom cover 62 has a coupling means 621, for example, outer threads 445 extending around the outside wall thereof and fastened to the connection means 51 of the housing 5 for allowing synchronous rotation of the bottom cover 62 with the housing 5, a plurality of stop rods 622 upwardly extending from the top wall and equiangularly spaced around the border and coupled to the limit grooves 615 of the follower member 61, hook portions 623 respectively extending from the stop rods 622 and hooked on a sliding groove (not shown) at the follower member 61 above the limit grooves 615 to prohibit disconnection of the bottom cover 62 from the follower member 61, a plurality of sector-like outlets 624 cut through the top and bottom sides corresponding to the sector-like guide slots 614 of the follower member 61, a split stub tube 625 upwardly extending from the top side at the center, and an accommodation hole 626 defined within the split stub tube 625 for receiving the other end of the torsion spring 63.

Figure 5:
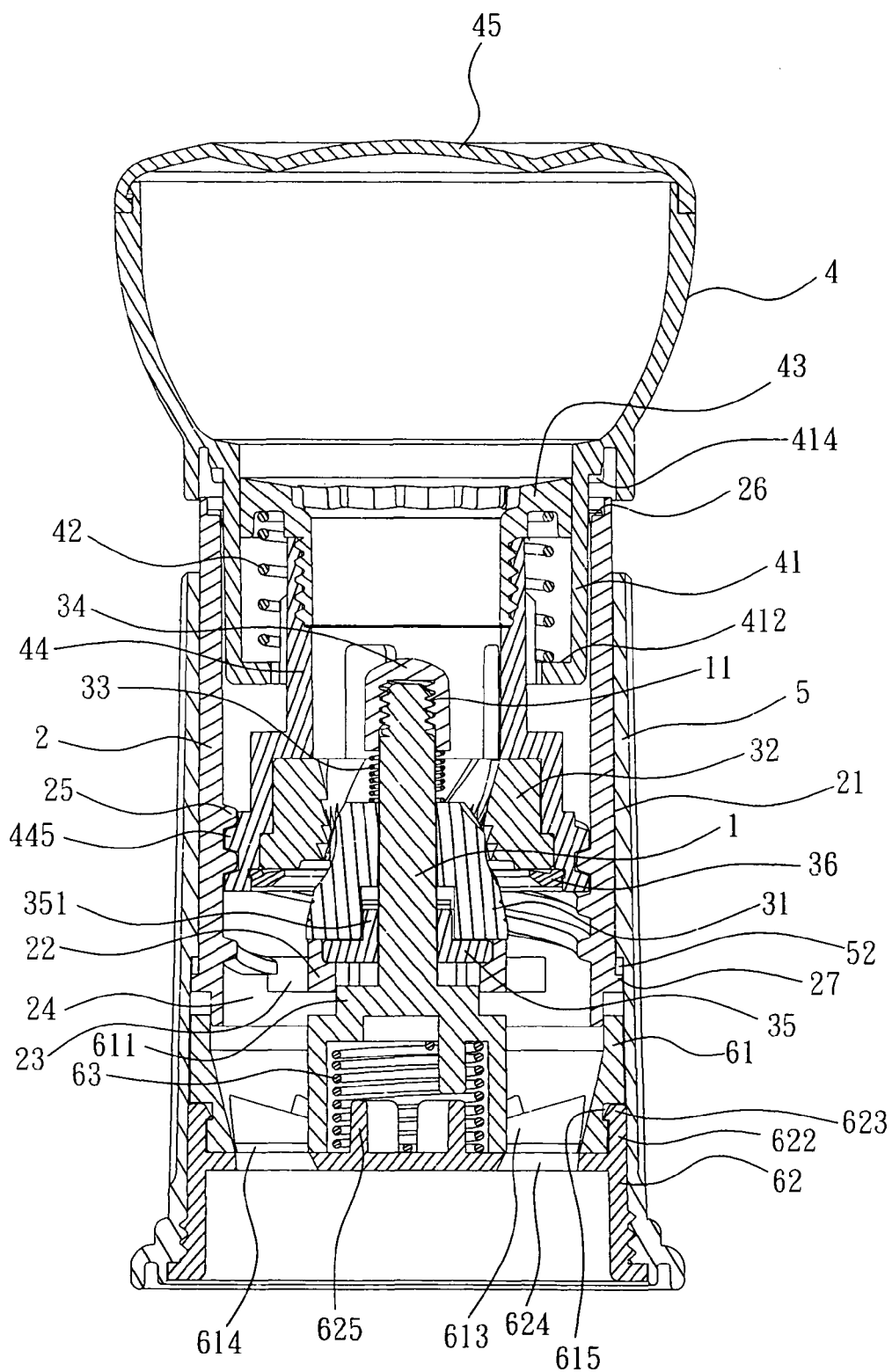
FIG. 5 is a schematic sectional view of the present invention, showing adjustment of ground powder particle size.

Referring to FIG. 5, when adjusting the particle size of the ground powder, lift the receptacle 4 relative to the housing 5. Because the rotary cap 44 is threaded into the base 2 and the guide feeder 43 is fastened to the rotary cap 44, the compression spring 33 is compressed and the engagement means 27 of the base 2 is forced into engagement with the stopping means 52 of the housing 5 when the receptacle 4 is lifted relative to the housing 5. At this time, the annular step 412 of the receptacle 4 is forced against the elastic member 42, and the retaining means 414 of the receptacle 4 is disengaged from the ratchet 26 of the base 2 for allowing rotation of the receptacle 4. When the user rotates the rotary cap 44 relative to the base 2, the outer threads 445 of the rotary cap 44 are moved along the inner threads 25 of the base 2 to change the relative distance between the grinding wheel 31 and the grinding base 32. Thereafter, release the receptacle 4 from the hand. When the receptacle 4 is released from the hand, the elastic member 42 and the compression spring 33 immediately return to their former shapes to force the retaining means 414 of the receptacle 4 into engagement with the ratchet 26 of the base 2 again and simultaneously to force the engagement means 27 of the base 2 away from the stopping means 52 of the housing 5, finishing the adjustment. According to the present invention, the grinding base 32 of the grinding unit 3 is a movable member fastened to the rotary cap 44 and movable with the rotary cap 44 relative to the grinding wheel 31 to adjust the gap between the grinding wheel 31 and the grinding base 32. After adjustment, the particle size of the ground powder is maintained at the desired level.

Figure 6:
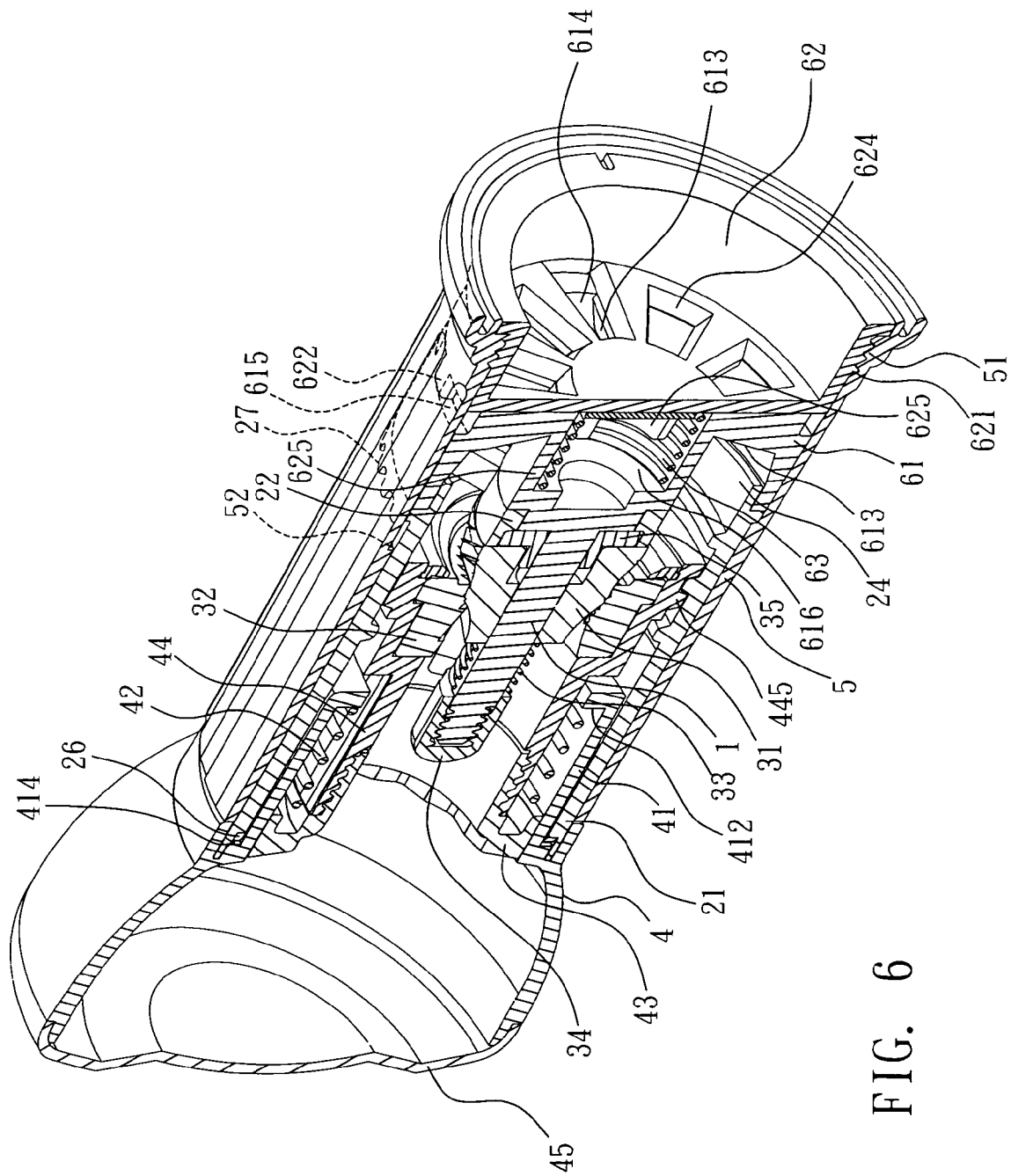
FIG. 6 is a sectional elevation of the present invention, showing the automatic open/close control device moved to the open position.

Referring to FIG. 6, when using the grinder, hold the receptacle 4 with one hand and rotate the housing 5 with the other hand. When rotating the housing 5, the bottom cover 62 is forced to rotate the follower member 61, the transmission shaft 1 and the link 35, causing rotation of the grinding wheel 31 relative to the grinding base 32. When the grinding pressure produced at the loaded material, for example, pepper between the grinding wheel 31 and the grinding base 32 is greater than the torsional force of the torsion spring 63, the follower member 61 is rotated with the bottom cover 62, causing the torsion spring 63 to preserve energy. When the stop rods 622 are respectively stopped at one end of each of the limit grooves 615, the sector-like guide slots 614 are respectively aimed at the sector like outlets 624, and therefore the ground powder is discharged out of the grinder through the sector-like guide slots 614 and the sector like outlets 624.

Figure 7:
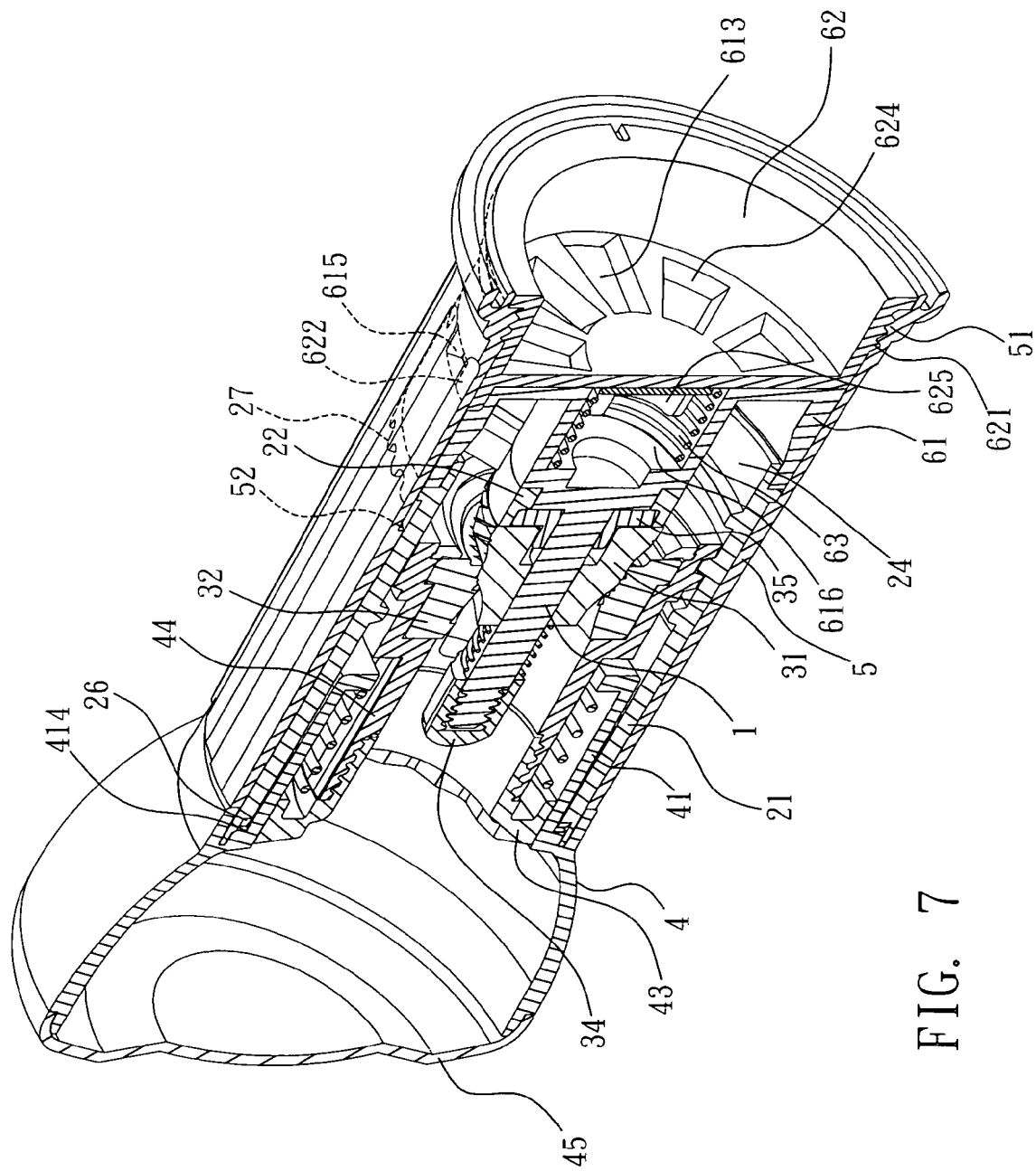
FIG. 7 is similar to FIG. 6 but showing the automatic open/close control device moved to the close position.

Referring to FIG. 7, when the rotation of the housing 5 is stopped, the torsion spring 63 releases the preserved energy to reverse the, moving the stop rods 622 along the respective limit grooves 615 to the other end of each of the limit grooves 615. At this time, the radial blocks 613 of the follower member 61 are moved to the outlets 624 to block the outlets 624, and therefore the grinder is closed. When all the loaded material (for example, pepper) has been well ground into powder and there is no material left in between the grinding wheel 31 and the grinding base 32, the friction force between the grinding wheel 31 and the grinding base 32 becomes smaller than the torsional force of the torsion spring 63. At this time, the follower member 61 runs idle, and the radial blocks 613 of the follower member 61 keep blocking the outlets 624 to block the outlets 624.

As stated above, the invention eliminates the drawback of the prior art design in which the opening/closing of the output port is manually controlled by means of a manual control switch. According to the present invention, when the friction pressure between the grinding wheel and the grinding base is greater than the torsion spring, the automatic open/close control device automatically opens the outlets for discharge of the ground powder and simultaneously drives the torsion spring to preserve energy. When the operation is stopped, the torsion spring releases the preserved energy to reverse the automatic open/close control device, thereby closing the outlets.

Further, the grinding unit is set in between the base and the receptacle. After lifting of the receptacle to disengage the retaining means of the receptacle from the retaining means of the base, the receptacle is rotatable relative to the housing to change the gap between the grinding wheel and the grinding base, thereby adjusting the ground powder particle size.

Although a particular embodiment of the invention has been described in detail for purposes of illustration, various modifications and enhancements may be made without departing from the spirit and scope of the invention.

What is claimed is:

1. A grinder comprising:
    a transmission shaft;
    a hollow base, said hollow base having a grinding chamber in which said transmission shaft suspends, and a plurality of open spaces in a bottom side thereof in communication with said grinding chamber;
    a grinding unit, said grinding unit comprising a grinding wheel and a grinding base, said grinding wheel being connected to said transmission shaft for rotation with said transmission shaft in said grinding chamber and kept spaced from said grinding base by a gap;
    a receptacle mounted on a top side of said hollow base, said receptacle comprising a bottom chamber, which holds said grinding base of said grinding unit in place;
    a housing, which houses said hollow base and a lower part of said receptacle;
    an automatic open/close control device for closing/opening said open spaces of said hollow base, said automatic open/close control device comprising a follower member connected to a bottom side of said hollow base opposite to said receptacle, said follower member comprising an axle holder fastened to one end of said transmission shaft and a plurality of radial blocks and guide slots radially and alternatively disposed at a bottom side thereof, a bottom cover, said bottom cover comprising a plurality of outlets cut through top and bottom sides thereof corresponding to the guide slots of said follower member, a position-limitation structure provided between said follower member and said bottom cover to secure said bottom cover to said follower member and to limit relative rotary motion between said follower member and said bottom cover within a predetermined angle, and a torsion spring connected between said follower member and said bottom cover;
    wherein when rotating said housing relative to said receptacle, said bottom cover, said follower member, said transmission shaft and said grinding wheel are rotated with said housing; when the friction force produced between said grinding wheel and said grinding base is greater than the torsional force of said torsion spring, said follower member is rotated relative to said bottom cover from a first position where said radial blocks of said follower member block said outlets of said bottom cover to a second position where said radial blocks of said follower member are moved away from said outlets of said bottom cover and said guide slots of said follower member are moved into alignment with said outlets respectively for discharge of ground powder out of the grinder through said guide slots and said outlets, and at the same time said torsion spring is twisted to preserve energy.

2. The grinder as claimed in claim 1, wherein said position-limitation structure comprises at least one limit groove provided at said follower member, and at least one stop rod provided at said bottom cover and respectively coupled to said at least one limit groove for movement with said bottom cover along said at least one limit groove between two distal ends of each of said at least one limit groove.

3. The grinder as claimed in claim 2, wherein each said stop rod of said position-limitation structure has a hooked portion hooked on a sliding groove on said follower member.

4. The grinder as claimed in claim 1, wherein said follower member has a bottom spring hole, which receives one end of said torsion spring; said bottom cover has a top accommodation hole, which receives an opposite end of said torsion spring.

5. The grinder as claimed in claim 1, wherein said grinding unit further comprises a link sleeved onto said transmission shaft and connected between said grinding wheel and said axle holder of said follower member, said link comprising a top coupling portion fastened to a bottom coupling portion of said grinding wheel and a plurality of mounting rods fastened to respective vertical mounting grooves of said axle holder of said follower member.

6. The grinder as claimed in claim 1, further comprising ground powder particle size adjustment mechanism, said ground powder particle size adjustment mechanism comprising:
    at least one inner thread extending around an inside wall of said grinding chamber of said hollow base;
    ratchet disposed at a top side of said grinding chamber of said hollow base;
    a tubular coupling flange downwardly extending from a bottom side of said receptacle;
    a guide feeder mounted in said receptacle;
    an elastic member connected between said tubular coupling flange and said guide feeder;
    a rotary cap affixed to said grinding base and upwardly inserted through said tubular coupling flange and fastened to said guide feeder;
    at least one outer thread provided at an extending around the periphery of said rotary cap and meshed with said at least one inner thread; and
    a retaining means provided inside said receptacle for engagement with said ratchet to prohibit rotation of said receptacle relative to said hollow base;
    when lifting said receptacle relative to said housing, said hollow base is forced into engagement with said housing and said tubular coupling flange is forced against said elastic member, and at the same time said retaining means is disengaged from said ratchet for allowing rotation of said receptacle relative to said hollow base to adjust the gap between said grinding base and said grinding wheel.

7. The grinder as claimed in claim 6, wherein said ratchet and said retaining means are reversed ratchets.

8. The grinder as claimed in claim 6, wherein said hollow base comprises an engagement means extending around the periphery at a bottom side thereof; said housing comprises a stopping means extending around an inside wall thereof for engagement with the engagement means of said hollow base to prohibit rotation of said hollow base with said receptacle when said hollow base is lifted with said receptacle; said grinding unit further comprises a screw cap fastened to one end of said transmission shaft to secure said transmission shaft to said grinding wheel, and a compression spring sleeved onto said transmission shaft and stopped between said screw cap and said grinding wheel.

9. The grinder as claimed in claim 6, wherein said tubular coupling flange comprises an opening, which accommodates said elastic member, and an annular step extending around an inside wall thereof; said elastic member is inserted through said opening of said tubular coupling flange and stopped between said annular step of said tubular coupling flange and a bottom side of said guide feeder.

10. The grinder as claimed in claim 6, wherein said guide feeder comprises a threaded bottom neck; said rotary cap comprises an internally threaded tubular top coupling flange inserted into the tubular coupling flange of said ground powder particle size adjustment mechanism and threaded onto said threaded bottom neck of said guide feeder to support said elastic member between said rotary cap and said guide feeder, the internally threaded tubular top coupling flange of said rotary cap comprising a plurality of longitudinal rails respectively coupling; the tubular coupling flange of said ground powder particle size adjustment mechanism comprises a plurality of longitudinal grooves equiangularly spaced an inside wall thereof and respectively coupled to the longitudinal rails of the internally threaded tubular top coupling flange of said rotary cap.

11. An automatic open/close control device comprising:
a follower member connected to a bottom side of a grinder, said follower member comprising an axle holder fastened to one end of a transmission shaft of said grinder, and a plurality of radial blocks and guide slots radially and alternatively disposed at a bottom side thereof;
a bottom cover, said bottom covercomprising a plurality of outlets cut through top and bottom sides thereof corresponding to the guide slots of said follower member;
a position-limitation structure provided between said follower member and said bottom cover to secure said bottom cover to said follower member and to limit rotary motion of said follower member relative to said bottom cover within a predetermined angle; and
a torsion spring connected between said follower member and said bottom cover;
wherein when the friction force produced bin said grinding unit during operation of said grinder is greater than the torsional force of said torsion spring, said follower member is rotated relative to said bottom cover from a first position where said radial blocks of said follower member block said outlets of said bottom cover to a second position where said radial blocks of said follower member are moved away from said outlets of said bottom cover and said guide slots of said follower member are moved into alignment with said outlets respectively for discharge of ground powder out of the grinder through said guide slots and said outlets, and at the same time said torsion spring is twisted to preserve energy.

12. The grinder as claimed in claim 11, wherein said The grinder as claimed in claim 1, wherein said position-limitation structure comprises at least one limit groove provided at said follower member, and at least one stop rod provided at said bottom cover and respectively coupled to said at least one limit groove for movement with said bottom cover along said at least one limit groove between two distal ends of each of said at least one limit groove.

13. The grinder as claimed in claim 12, wherein each said stop rod of said position-limitation structure has a hooked portion hooked on a sliding groove on said follower member.

14. The grinder as claimed in claim 11, wherein said follower member has a bottom spring hole, which receives one end of said torsion spring said bottom cover has a top accommodation hole, which receives an opposite end of said torsion spring.

15. The grinder as claimed in claim 11, wherein said grinding unit further comprises a link sleeved onto said transmission shaft and connected between said grinding wheel and said axle holder of said follower member, said link comprising a top coupling portion fastened to a bottom coupling portion of said grinding wheel and a plurality of mounting rods fastened to respective vertical mounting grooves of said axle holder of said follower member.

\* \* \* \* \*